United States Patent
Negishi et al.

(10) Patent No.: US 11,330,408 B2
(45) Date of Patent: May 10, 2022

(54) INFORMATION PROCESSING APPARATUS, TERMINAL DEVICE, AND INFORMATION PROCESSING METHOD

(71) Applicant: SONY CORPORATION, Tokyo (JP)

(72) Inventors: Atsushi Negishi, Tokyo (JP); Takashi Ogata, Tokyo (JP); Tamotsu Ishii, Tokyo (JP); Masatomo Kurata, Tokyo (JP); Sota Matsuzawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/976,948

(22) PCT Filed: Feb. 28, 2019

(86) PCT No.: PCT/JP2019/007891
§ 371 (c)(1),
(2) Date: Aug. 31, 2020

(87) PCT Pub. No.: WO2019/172087
PCT Pub. Date: Sep. 12, 2019

(65) Prior Publication Data
US 2020/0396572 A1  Dec. 17, 2020

(30) Foreign Application Priority Data

Mar. 8, 2018 (JP) .............................. JP2018-041837

(51) Int. Cl.
*H04W 4/12* (2009.01)
*H04W 4/18* (2009.01)
(Continued)

(52) U.S. Cl.
CPC ............ *H04W 4/185* (2013.01); *G06F 16/29* (2019.01); *G06F 16/9537* (2019.01);
(Continued)

(58) Field of Classification Search
CPC ....... H04W 4/185; H04W 4/12; H04W 88/02; H04W 88/184; H04W 88/18;
(Continued)

(56) References Cited

U.S. PATENT DOCUMENTS

2009/0047983 A1* 2/2009 Klassen ............ H04M 1/72436
455/466
2015/0007042 A1* 1/2015 Gay ........................ G06F 3/017
715/744

(Continued)

FOREIGN PATENT DOCUMENTS

| CN | 106462598 A | 2/2017 |
| CN | 108139988 A | 6/2018 |

(Continued)

OTHER PUBLICATIONS

International Search Report and Written Opinion of PCT Application No. PCT/JP2019/007891, dated Apr. 9, 2019, 10 pages of ISRWO.

*Primary Examiner* — Julio R Perez
(74) *Attorney, Agent, or Firm* — Chip Law Group

(57) ABSTRACT

Provided is an information processing apparatus that effectively utilizes contexts and has the highly convenient messaging function, a method thereof and a terminal device used for message communication. The information processing apparatus includes a communication section and a control section. The communication section communicates a message between respective terminal devices used by a plurality of users. The control section acquires is a context of one or more users among the plurality of users, and controls at least (Continued)

one of creation or communication of message-related information including content or a format of the message on the basis of the acquired context.

20 Claims, 9 Drawing Sheets

(51) Int. Cl.
    *G06F 16/9537*     (2019.01)
    *G06F 16/29*     (2019.01)
    *G06F 3/04883*     (2022.01)
    *H04W 88/02*     (2009.01)
    *H04W 88/18*     (2009.01)

(52) U.S. Cl.
    CPC ........... *H04W 4/12* (2013.01); *G06F 3/04883* (2013.01); *H04W 88/02* (2013.01); *H04W 88/184* (2013.01)

(58) Field of Classification Search
    CPC .. G06F 16/9537; G06F 16/29; G06F 3/04883; G06F 3/04847; G06F 3/04842; H04L 67/26; H04L 67/22
    See application file for complete search history.

(56) References Cited

U.S. PATENT DOCUMENTS

| | | | |
|---|---|---|---|
| 2016/0349948 A1* | 12/2016 | Shigemitsu | G06F 3/04842 |
| 2017/0032186 A1* | 2/2017 | Murata | G06F 3/0304 |
| 2018/0248819 A1 | 8/2018 | Shionozaki | |
| 2019/0265946 A1* | 8/2019 | Bae | G06F 3/04883 |
| 2020/0396572 A1* | 12/2020 | Negishi | G06F 16/9537 |

FOREIGN PATENT DOCUMENTS

| | | | |
|---|---|---|---|
| EP | 3147798 A1 | 3/2017 | |
| EP | 3367249 A1 | 8/2018 | |
| JP | 2005-267437 A | 9/2005 | |
| JP | 2010-145421 A | 7/2010 | |
| JP | 2015-138373 A | 7/2015 | |
| KR | 10-2018-0068975 A | 6/2018 | |
| WO | 2015/178078 A1 | 11/2015 | |
| WO | 2016/203805 A1 | 12/2016 | |
| WO | 2017/068816 A1 | 4/2017 | |
| WO | WO-2017068816 A1 * | 4/2017 | ............. H04L 51/16 |

* cited by examiner

| Context category | Context example | Sensing or recognition method |
|---|---|---|
| Travel | Stay, departure, traveling, arrival | Travel is recognized by a position sensor or an IMU. The four states have transition relationships |
| Location | Country, prefecture, state, absolute coordinates, indoor coordinates, location class (office, home, supermarket, train, hospital) | Basically, a location is recognized by the position sensor, but the position sensor may be combined with Wi-Fi, the IMU, a vision, or the like to find detailed coordinates or indoor coordinates. The location class is acquired by a recognizer subjected to learning in advance. |
| Means of transportation | Stationary, walking, bicycle, car, train, Shinkansen, ship, airplane | A means of transportation is recognized by the position sensor or the IMU. |
| Attribute | Sex, name, age, date of birth, native language, office, address, phone number, schedule, commutation route, address of place of work | In many cases, an attribute is manually registered by the user in advance. However, some attributes may be estimated from past contexts such as locations and behavior like the commutation route and the address of place of work. |
| Behavior | N/A, travel, rest, working, sleeping, eating, egestion, drinking, chatting, exercising, playing, studying, cleaning, reading, smartphone | Behavior is recognized by using sensors such as the IMU and the vision and contexts such as a location and an environment. In addition, a plurality of states may be maintained at a same time. |
| Neighboring/ accompanying person | People (member of family, friend, lover, boss, complete stranger) adjacent object (TV, house key, Starbucks, taxi) | BLE intensities or environmental sounds of respective users may be matched, or usable sensors/contexts such as a vision installed in an environment and a location context may be combined. |
| Payment information | Amount of payment, shop name, breakdown | A credit card history is used. |
| Environment | Noise, air temperature, weather, illuminance, wind velocity, humidity, altitude, population density | A sensor corresponding to each mode such as a microphone or a temperature sensor is used. |
| Biological condition | Body temperature, constipation, menstruation, good/ bad condition, affected part, concentration/distraction, feeling safe/anxiety, consciousness level | Biological signals such as body temperature, pulse wave, electrocardiogram, or brain wave or facial expression obtained through the vision, movement obtained by the IMU are estimated as characteristics. |
| Preference | Music, food, sports, color, book, movie, thought, type of opposite sex | In a way similar to the attribute, the preference may also be explicitly registered by the user and implicitly estimated from past contexts related to feelings or habit of location contexts or behavior contexts. |
| Feeling | Eight basic feelings (joy, trust, worry, surprise, sorrow, dislike, anger, prediction) Eight advanced feelings (optimism, love, submissiveness, awe, disappointment, remorse, contempt, aggressiveness) | In a way similar to the health condition, a feeling is estimated by combining current and past contexts related to the environment and behavior in addition to the biological signals, vision, IMU, and the like. |

FIG.4

INFORMATION PROCESSING APPARATUS, TERMINAL DEVICE, AND INFORMATION PROCESSING METHOD

CROSS REFERENCE TO RELATED APPLICATIONS

This application is a U.S. National Phase of International Patent Application No. PCT/JP2019/007891 filed on Feb. 28, 2019, which claims priority benefit of Japanese Patent Application No. JP 2018-041837 filed in the Japan Patent Office on Mar. 8, 2018. Each of the above-referenced applications is hereby incorporated herein by reference in its entirety.

TECHNICAL FIELD

The present technology relates to an information processing apparatus that performs processing of message communication, a method thereof, a program thereof, and a terminal device used for message communication.

BACKGROUND ART

A system described in Patent Literature 1 includes a route search assistant server that searches for a route to a destination and calculates necessary time or the like on the basis of behavior plans of a user. Specifically, a mobile phone (user terminal) held by the user transmits a behavior plan input by the user to the route search assistant server via the Internet, and the route search assistant server registers the behavior plan on a plan database. The route search assistant server notifies the user terminal of departure time based on the plan database, and transmits information regarding a map and a route to a destination to the user terminal (for example, see paragraphs [0018], and [0100] to [0103] of Patent Literature 1).

CITATION LIST

Patent Literature

Patent Literature 1: JP 2010-145421A

DISCLOSURE OF INVENTION

Technical Problem

Patent Literature 1 merely notifies the terminal of the user himself/herself, of information regarding a result of the route search obtained from the behavior plan of the user. However, a highly convenient messaging function has been desired, the messaging function being capable of message communication with another user terminal not only in accordance with the behavior plan but also in accordance with any context. Here, the wording "context" is used in a broad sense and means a circumstance, a situation, background, or the like, for example. It would appear that it is possible to provide the highly convenient messaging function by effectively utilizing information regarding such a context.

A purpose of the present disclosure is to provide an information processing apparatus that effectively utilizes contexts and has the highly convenient messaging function, a method thereof, a program thereof, and a terminal device used for message communication.

Solution to Problem

To achieve the above-described purpose, an information processing apparatus according to an aspect includes a communication section and a control section.

The communication section is configured to communicate a message between respective terminal devices used by a plurality of users.

The control section is configured to acquire a context of one or more users among the plurality of users, and control at least one of creation or communication of message-related information including content or a format of the message on the basis of the acquired context.

Since the control section controls message-related information or communication of such information on the basis of the context, it is possible to achieve a highly convenient messaging function.

The communication section may be configured to acquire a reception request for receiving the context of the user.

The control section may include a creation section configured to acquire the context on the basis of the reception request and create at least one of information for allowing selection of whether to communicate the message or a candidate to select the message-related information, on the basis of the context.

This allows the creation section to automatically create a message on the basis of the context of the user. In addition, since a user who transmits the context can select the message-related information, it is possible to provide the messaging function that is convenient for each user.

The communication section may be configured to acquire a transmission request for transmitting the context of the user.

The control section may include a creation section configured to acquire the context on the basis of the transmission request and create at least one of information for allowing selection of whether to communicate the message or a candidate to select the message-related information, on the basis of the context.

The communication section may be configured to transmit information indicating that the content of the message is automatically created.

This allows the user to recognize that the content of the message is automatically created.

The control section may be configured to perform control based on the context on the basis of content or a format of a message that has been communicated in past.

The content of the message that has been communicated in past may include at least one of a position of the user, a means of transportation of the user, behavior of the user, or a message format.

The control section may include a creation section configured to create a candidate to select the message-related information based on the context in a message format corresponding to frequencies of formats of messages that have been communicated in past.

The control section may include a creation section configured to create a candidate to select the message-related information based on the context in a format of expression corresponding to frequencies of formats of expression of content of messages that have been communicated in past.

The context may include at least one of a past context, a current context, or a future context of the user.

The control section may be configured to acquire a context based on input information that has been input to an input section of the terminal device.

The input section includes at least one of a microphone, a camera, an operation section, a position sensor, or an inertial measurement section (MIU), and the input section may be configured to acquire at least one of a position of the user, a means of transportation of the user, behavior of the user, or content of operation performed by the user on the operation section, as the input information.

The control section may be configured to control a security level of communication of the message-related information on the basis of the context.

The security level may include at least one of communication availability of the message, a communication destination of the message, or the content of the message.

According to an aspect, a terminal device is used by a user among a plurality of terminal devices to be used by respective users, and the terminal device includes a messaging function section and a communication section.

The messaging function section has a function of creating a message; and

The communication section is configured to communicate the message between the terminal device and another terminal device via an information processing apparatus configured to acquire the context of the user and control at least one of creation or communication of message-related information including content or a format of the message on the basis of the acquired context.

The communication section may be configured to make at least one of transmission of a reception request for receiving a context of another user from the other terminal device, or transmission of a transmission request for transmitting the context of the user to the other terminal device.

The terminal device may further include: an input section to which input information is to be input; and a display that displays at least one of message-related information or an icon image, each of which corresponding to a current context of the user or another user in the input information.

The terminal device may further include a storage section that stores fingerprint data of the user allocated to data associated with the messaging function section or a function that is executable for the messaging function section.

The terminal device may further include an operation section that receives operation performed by the user. The operation section may be configured to receive different swipe gestures, the respective swipe gestures corresponding to transmission of the reception request and transmission of the transmission request.

An information processing method according to an aspect is an information processing method to be performed by an information processing apparatus configured to communicate a message between respective terminal devices used by a plurality of users.

A program according to an aspect causes an information processing apparatus to execute the above-described information processing method.

Advantageous Effects of Invention

As described above, according to the present technology, it is possible to achieve the highly convenient messaging function by effectively utilizing a context.

Note that the effects described here are not necessarily limited, and any effect that is described in the present disclosure may be exhibited.

BRIEF DESCRIPTION OF DRAWINGS

FIG. 4 is a table showing details of contexts.

MODE(S) FOR CARRYING OUT THE INVENTION

Hereinafter, embodiments of the present technology will be described with reference to the drawings.

1. System Configuration

Figure 1:
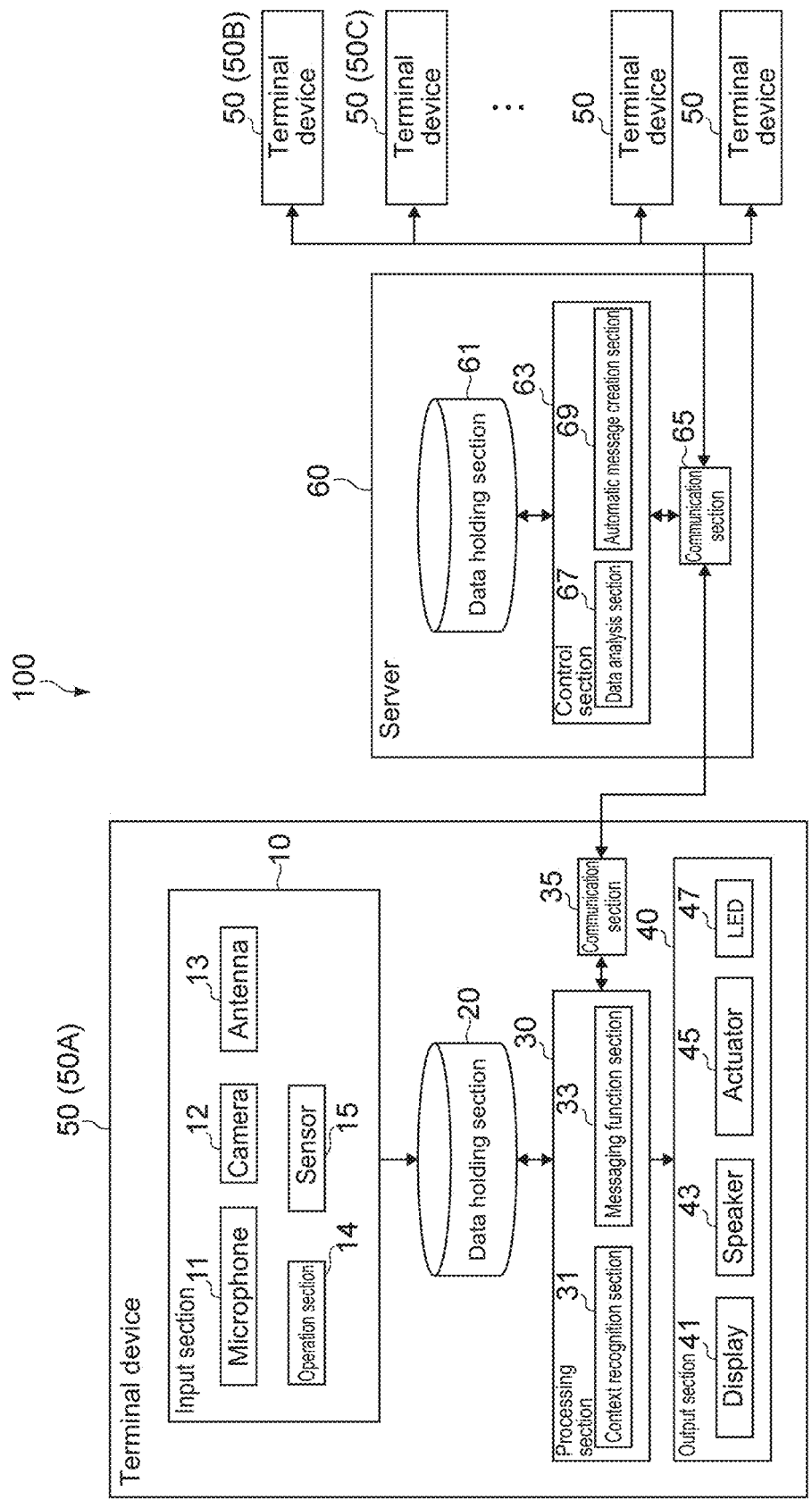
FIG. 1 is a block diagram illustrating a configuration of a system according to an embodiment.

FIG. 1 is a block diagram illustrating a configuration of a system according to an embodiment. A system 100 includes a server (information processing apparatus) 60 and multiple terminal devices 50 according to the embodiment.

1.1) Terminal Device

The multiple terminal devices 50 may be used by respective users. Each of the terminal devices 50 is connectable to the server 60 via a network using the Internet Protocol (IP), typically the Internet. Typically, the terminal device 50 is a smartphone, a tablet computer, a wearable computer, or the like.

The terminal device 50 includes an input section 10, a data holding section 20, a processing section 30, a communication section 35, and an output section 40.

The input section 10 includes a microphone 11, a camera 12, an antenna 13, an operation section 13, a sensor 15, and the like.

The antenna 13 includes an antenna used for Near-field communication (NFC), Bluetooth, and/or the like, for example. The operation section 14 includes a touchscreen, a physical button, and/or the like.

For example, the sensor 15 includes a position sensor, an acceleration sensor, an angular velocity sensor, a geomagnetic sensor, an illuminance sensor, a temperature sensor, a barometric pressure sensor, or the like with regard to the device. The sensor 15 detects acceleration, angular velocity, an azimuth, illuminance, temperature, barometric pressure, or the like. In addition, in the case where the device including the sensor 15 is carried by the user or is worn by the user, the sensor 15 is capable of detecting various kinds of information as information related to the user such as information indicating movements or directions of the user.

In addition, the sensor 15 may include a biological sensor that detects biological information of the user such as a pulse, blood pressure, body temperature, muscle electric potential, perspiration, brain waves, a sense of touch, a sense of smell, or a sense of taste. The input section 10 may include a processing circuit that analyzes information detected by such sensors, image data detected by the camera 12, and/or sound data detected by the microphone 11, and acquire information indicating a user's feeling. Alternatively, the information and/or data regarding the feeling may be output to an interface without being subjected to the analysis, and the processing section 30 may analyze such information and/or data, for example.

In addition, it is also possible to use the input section 10, the microphone 11, the camera 12, the sensor 15, or the like to acquire an image or sound of a vicinity of the user or the device as data. In addition, the input section 10 may include a position sensor that detects an indoor or outdoor position. Specifically, the position sensor may include a Global Navigation Satellite Systems (GNSS) receiver such as a Global Positioning System (GPS) receiver, a Global Navigation Satellite System (GLONASS) receiver, a BeiDou Navigation Satellite System (BDS) receiver, a communication apparatus, and/or the like. The communication apparatus detects a position by using a technology such as Wi-Fi, multiple-input and multiple-output (MIMO), cellular communication (such as position detection using a mobile base station or a femtocell), or near field wireless communication (such as Bluetooth Low Energy (BLE) or Bluetooth (registered trademark)). In this case, the function of the position sensor and the function of the communication section 35 overlap each other.

The processing section 30 includes a context recognition section 31 and a messaging function section 33.

The context recognition section 31 recognizes a current context of the user who is using the terminal device 50. Specifically, the context recognition section 31 recognizes, as the context of the user, various kinds of information related to the current user, which is input information that has been input to the input section 10.

The context is a circumstance, a situation, or background of the user. The context includes at least one of a past context, a current context, or a future context. For example, the past context includes context of a place where the user has been in the past, or the like. Such context has been acquired from a database or past message exchange. The current context includes a current context acquired by the sensor 15. The future context includes a context of future schedule data input as a plan.

Information regarding the context includes content of operation that has been manually performed on the terminal device 50 by the user from past to present, and data of an operation target. For example, examples of the context include content or formats (including a format or the like) of emails or messages transmitted by the user from past to present. The future schedule input as the plan is also included in the content of operation performed by the user from past to present, and the data of the operation target.

In addition, the information regarding the context also includes a relationship between users. The relationship between the users means, for example, a good friend relationship, a falling-out relationship, a fighting relationship, a senior-junior relationship, a boss-subordinate relationship, or the like. The server 60 may acquire information regarding the relationship between users through learning, or the relationship between users may be set and decided by one of the users in advance. In the case of learning, the server 60 is capable of acquiring the information regarding the relationship between the users on the basis of emails or messages exchanged between the users, attributes of the users, or other information.

The messaging function section 33 has a function of creating a message on the basis of information input by the user via the input section 10 (typically, the operation section 14).

The communication section 35 mainly has a function of performing IP communication. The data holding section 20 has a function of holding (storing) various kinds of data, programs, and application software that are necessary for performances of the respective sections.

The output section 40 includes a display 41, a speaker 43, an actuator 45, a light-emitting diode (LED) 47, or the like. For example, the actuator 45 has a vibration function using an eccentric motor or the like. The LED 47 is used as an indicator that gives a notification or warning.

The terminal device 50 includes basic components such as a CPU, RAM, and ROM as hardware. In addition, the terminal device 50 includes hardware that configures the input section 10 and the output section 40.

1.2) Server

The server 60 performs control related to communication of messages between a terminal device 50 (50A) of a user and a terminal device 50 (50B, 50C, . . . ) of one or more other users. The server 60 includes a control section 63, a communication section 65, and a data holding section 61.

The control section 63 has a function of acquiring (information regarding) at least some contexts of one or more users among the plurality of users from past to present, and controlling at least one of creation or communication of message-related information on the basis of the acquired contexts. The message-related information is related to the messages and includes content of the messages.

The message-related information is information such as content (message body) of a message, a format of the message, and/or a type, granularity, or the like of a current context serving as a premise for creating the message. Communication of the message-related information includes processing related to communication availability of the message. Details thereof will be described later.

The format of the message includes a format of expression of the content of the message. Examples of the format of the message include a text format, an image format (including a stamp image, for example), a sound format, a video format, and the like.

The control section 63 includes a data analysis section 67, an automatic message creation section (creation section) 69.

The data analysis section 67 has a function of analyzing contexts transmitted from the terminal devices 50. The automatic message creation section 69 automatically creates a message on the basis of information (in particular, context) obtained through data analysis made by the data analysis section 67.

The communication section 35 mainly has a function of performing IP communication. The data holding section 61 has a function of holding (storing) various kinds of data and programs that are necessary for performances of the respective sections.

2. Performance of System

Figure 2:
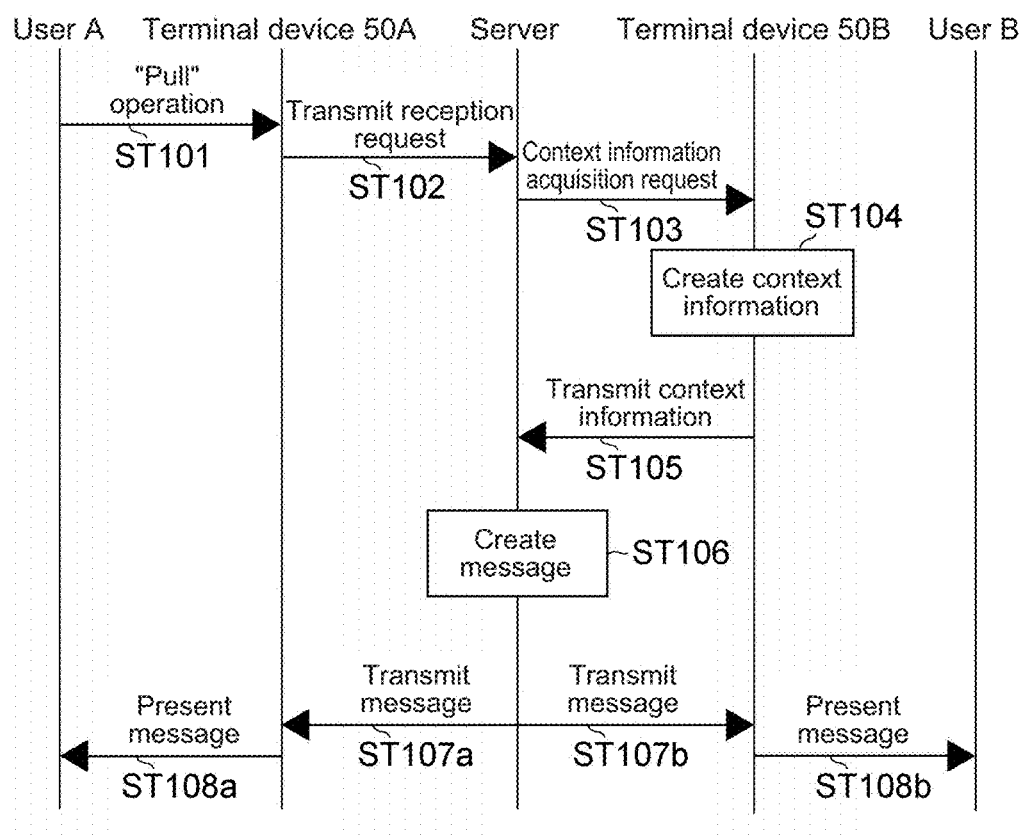
FIG. 2 is a sequence diagram illustrating basic performance of the system on the basis of "pull" operation.
Figure 3:
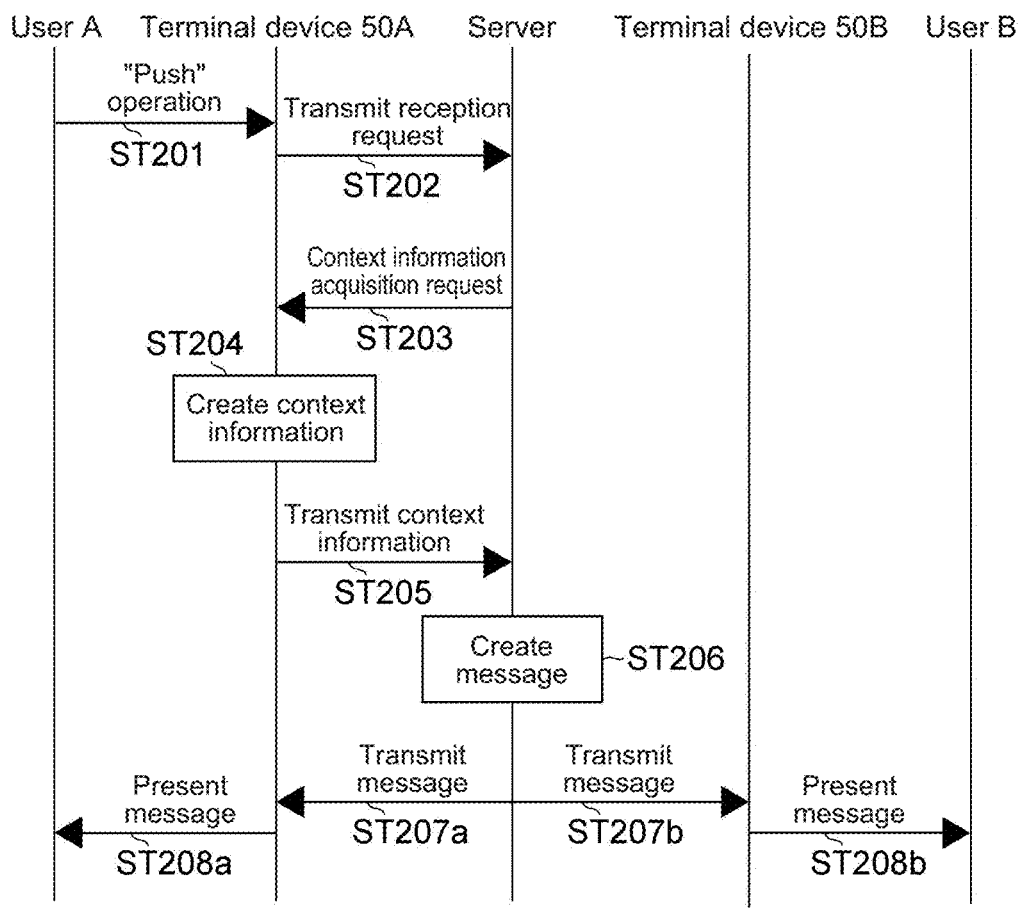
FIG. 3 is a sequence diagram illustrating basic performance of the system on the basis of "push" operation.

FIG. 2 and FIG. 3 each are a sequence diagram illustrating basic performance of the system 100. Here, a case will be described where a message is communicated between two users including a user A (first user) and a user B (second user). Performance of the system 100 is started by an action (operation input to the terminal device 50) taken by the user A, the action serving as a trigger.

The wording "communication" means at least one of transmission or reception.

FIG. 2 illustrates performance of creating a message based on a context of the user B. This performance is triggered by "pull" operation (Step (hereinafter, abbreviated to "ST") 101) performed by the user A. FIG. 3 illustrates performance of creating a message based on a context of the user A. This performance is triggered by "push" operation (ST 201) performed by the user A. The messaging function section 33 of the terminal device 50 executes the "pull" operation and the "push" operation.

2.1) "Pull" Operation

The "pull" operation is operation performed by a user for causing the terminal device 50A of the user A to transmit a reception request to the server 60 (ST 102). The reception request is a request to receive a current context of the user B. For example, the input section 10 of the terminal device 50A receives the reception request operation performed by the user A, and the reception request is transmitted as a message to the server 60 via the messaging function section 33.

Examples of the "pull" operation include operation performed by a hand or a finger via the operation section 14, speech recognition using the microphone, a hand, finger, or body gesture operation captured by the camera 12, and the like. The same applies to the "push" operation, which will be described later.

Examples of a message of the reception request include content saying "Where are you now?", content saying "What time are we meeting?", content saying "How about a drink tomorrow?", and the like, for example. As described later, for example, the reception request is displayed as an icon (icon image) by a graphical user interface (GUI) of the messaging function section 33. When the user selects the icon, the reception request is transmitted. Instead of the icon, it is also possible to select a text candidate.

Determination of whether the message corresponds to the reception request (this determination is made by the terminal device 50 or the server) may be based on pre-registration made by the user or may be based on learning by the terminal device 50A. In the case of the pre-registration, the user manually stores, in the data holding section 20, words or a sentence indicating that the message corresponds to the reception request via the terminal device 50A. Instead of the pre-registration, the data holding section 20 may hold templates or fixed sentences of messages in advance. Alternatively, it is also possible to prepare a dedicated icon for the above-described reception request and a dedicated icon for a transmission request, which will be described later. In the case of learning, the server 60 may make language analysis of content of received messages including past messages received by the user, and use information regarding interpretation results.

The server 60 transmits a context acquisition request to the terminal device 50B of the user B (ST 103). The terminal device 50B generates a context of the user B (ST 104), and transmits the generated context to the server 60 (ST 105). In ST 104, the data analysis section 67 analyzes information obtained from the input section 10 or data held by the data holding section 61, and generates the context.

FIG. 4 is a table showing details of the contexts. Examples of "categories" of the contexts include "travel", "location", "means of transportation", "attribute", "behavior", "neighboring/accompanying person", "payment information", "environment", "biological condition", "preference", "feeling", and the like. In other words, the context is a context belonging to such a category or a context recognized or generated on the basis of the context.

For example, the "travel" indicates behavior related to current movement of the user, and specifies four states including stay, departure, traveling, and arrival, for example. Information regarding a specified state is the context. These four states have transition relationships. Here, the "travel" information (four states) may be detected by the sensor 15 such as the position sensor or the IMU in this example.

The "location" indicates a current geographical position of the user. For example, the position of the user is specified by the position sensor. Information regarding the specified location is the context. The position sensor specifies information regarding a detailed position of the user by using an ambient vision recognized by Wi-Fi, the IMU, or the camera 12 in cooperation with another server.

Examples of the "means of transportation" include walking, a bicycle, a car, a train, and the like, for example. Information regarding the "means of transportation" may be detected by the position sensor or the IMU. Information regarding the detected means of transportation is the context.

Examples of the "behavior" includes N/A, travel, rest, working, sleeping, eating, egestion, and the like, for example. Information regarding the "behavior" is recognized on the basis of an ambient vision recognized by the IMU or the camera 12, or a context belonging to the "location" category or the "environment" category. The recognized information is the context.

The "attribute" is information for specifying an individual user. For example, the "attribute" includes sex, name, age, date of birth, or the like. In many cases, the user manually registers various kinds of "attribute" information in advance (stores the various kinds of "attribute" information in the data holding section 20). The server 60 may receive approval from the user and acquire the various kinds of "attribute" information from another server that stores the various kinds of "attribute" information. Alternatively, the server 60 or the terminal device 50 may acquire (or generate) the various kinds of "attribute" information through learning based on past contexts belonging to the "location" category, the "behavior" category, or the like, for example. The various kinds of information that has been registered or acquired as described above for specifying an individual user is the context.

Note that, at least portions of concepts of two or more categories may overlap each other. For example, the "travel" category may be included in the "behavior" category, and the "feeling" category may be included in the "biological condition" category.

Returning to FIG. 2, the automatic message creation section 69 of the server 60 that has received the context creates a message based on the context (ST 106). For example, it is assumed that content of the reception request message transmitted in ST 102 indicates content asking a current "location" of the user B such as the question asking "Where are you now?". In this case, the server 60 acquires information regarding a current position of the user B as the context, and creates a message based on the information.

The message is a message including content indicating the current position of the user B such as a message saying "I'm in my office." or the like, for example.

In ST 106, the server 60 may create the message by using not only the current context (such as the current position) as described above but also data learned through language analysis of content of messages that have been communicated with the user in past.

The server 60 transmits the created message to the terminal device 50A (ST 107a), and also transmits the created message to the terminal device 50B (ST 107b). The terminal devices 50A and 50B present the message to the users A and B, respectively (ST 108a and ST 108b). A typical method of presenting the message is to display the message on the display 41. Since the message is also transmitted to the terminal device 50B, it is possible for the user B to confirm that the message based on the context of the user B himself/herself is returned in response to the reception request from the user A. The message transmitted to the terminal device 50B may be the same as the message transmitted to the terminal device 50A, or may be a confirmation message saying that "the following message is transmitted", for example.

Other examples of the method of presenting the message in ST 108a and ST 108b include a method of reading out sentences by voice and a method of presenting the message by vibration. In the case of the method of presenting the message by vibration, the terminal devices 50A and 50B may use different types of vibration between a case where the user is in his/her house and a case where the user is not in his/her house (for example, the user is in his/her office or the like), for example.

2.2) "Push" Operation

With reference to FIG. 3, the "Push" operation is operation performed by a user (ST 201) for causing the terminal device 50A to transmit a transmission request to the server 60 (ST 202). The transmission request is a request to transmit current context of the user A to the terminal device 50B. The input section 10 of the terminal device 50A receives the transmission request operation performed by the user A, and the server 60 receives the reception request.

The terminal device 50A transmits the transmission request to the server 60 (ST 202), and the server 60 receives the reception request. The transmission request is transmitted as a message via the messaging function section 33. For example, the message corresponding to the transmission request includes words representing the context of the user A. Alternatively, the transmission request is transmitted when the user selects an icon on the GUI, the icon representing (corresponding to) the context.

The server 60 transmits a context acquisition request to the terminal device 50A (ST 203). The terminal device 50A generates the context of the user A (ST 204), and transmits the generated context to the server 60 (ST 205).

In ST 204, the terminal device 50A generates the context on the basis of information obtained from the input section 10 or data held by the data holding section 20. The automatic message creation section 69 of the server 60 that has received the context creates a message based on the context (ST 206). For example, it is assumed that content of the reception request message transmitted in ST 202 indicates a "current location" (or an icon corresponding to the current location). In this case, the server 60 acquires information regarding a current location of the user A as the context, and creates a message based on the information. The message is a message including content indicating the current location of the user A such as a message saying "I'm in my office." or the like, for example.

The server 60 transmits the message to the terminal device 50B (ST 207b), and also transmits the message to the terminal device 50A (ST 207a). The terminal devices 50A and 50B present the message to the users A and B, respectively (ST 208a and ST 208b). Since the message is also transmitted to the terminal device 50A, it is possible for the user A to confirm that transmission of the message based on the context of the user A himself/herself is completed. The message transmitted to the terminal device 50A may be the same as the message transmitted to the terminal device 50B, or may be a confirmation message saying that "the following message is transmitted" for example.

3. Example of GUI of Messaging Function Section

Figure 5A:
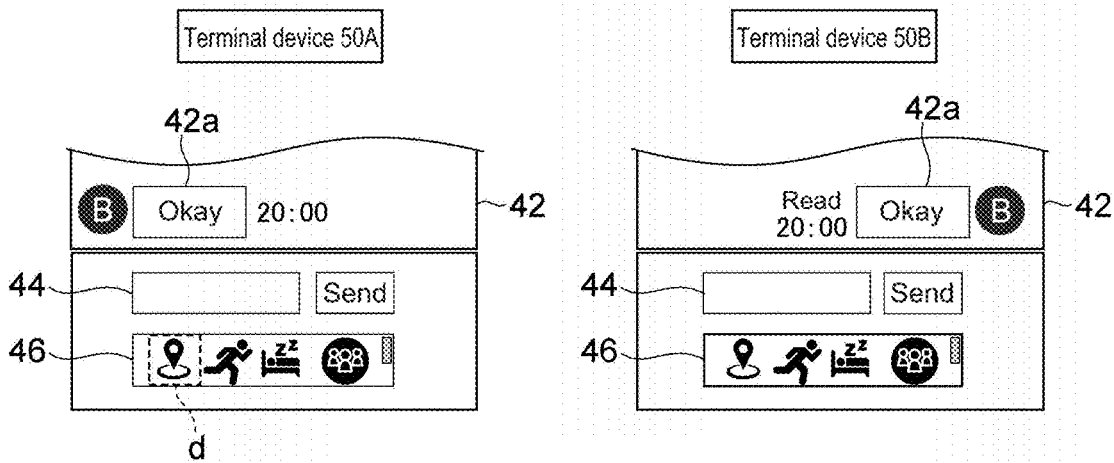
FIGS. 5A and 5B each illustrate a portion of an example of UIs of messaging function sections displayed on displays of terminal devices.
Figure 5B:
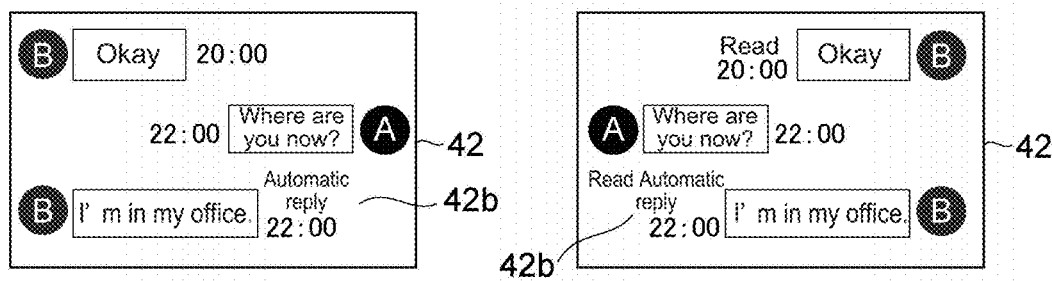

FIGS. 5A and 5B each illustrate a portion of an example of UIs of the messaging function sections 33 displayed on the displays 41 of terminal devices 50 (such as smartphones). In FIGS. 5A and 5B, content displayed on the display 41 of the terminal device 50A are illustrated on the left side, and content displayed on the display 41 of the terminal device 50B are illustrated on the right side.

With reference to FIG. 5A, a message progress display region 42, is displayed on an upper side, and a message input region 44 and a context icon selection region 46 are displayed on a lower side. The message progress display region 42 mainly displays a transmitted/received message content 42a. Circular icons are displayed in the message progress display region 42 and are adjacent to message content. The circular icon "A" indicates that a message is transmitted by the user A, and the circular icon "B" indicates that a message is transmitted by the user B.

The message input region 44 is a region to which the user manually inputs a message content. The context icon selection region 46 displays a list of icons corresponding to respective context types described above (as illustrated in FIG. 4, context classified into a context category or a finer example). The message input region 44 and the context icon selection region 46 may be displayed on different screens.

Here, a case will be described where the context is acquired by the "Pull" operation. As illustrated in FIG. 5A, the user A selects an icon (enclosed by a dashed line d) corresponding to the question asking "Where are you now?", and transmits the selected icon to the server 60 as a reception request (ST 101 and ST 102).

The server 60 acquires the context of the user B by using the method described above with reference to FIG. 2, and creates a message saying "I'm in my office.", for example, the message corresponding to the acquired context (ST 103 to ST 106). The server 60 transmits the created message to the terminal devices 50A and 50B (ST 107a and ST 107b). As illustrated in FIG. 5B, the terminal devices 50A and 50B display the message (ST 108a and ST 108b).

For example, the server 60 may transmit information indicating that the message is automatically created by the automatic message creation section 69, to the terminal devices 50A and 50B in addition to the message content. In this case, as illustrated in FIG. 5B, the terminal devices 50A and 50B are also capable of displaying information indicating "automatic reply" 42b or the like on the basis of such information. This allows the users A and B to recognize that the message is automatically created.

The messaging function section 33 may present a list of fixed messages corresponding to various kinds of contexts (fixed message selection screen) instead of the context icons in the context icon selection region 46. The fixed messages are held by the data holding section 20 or the data holding section 61.

Figure 6:
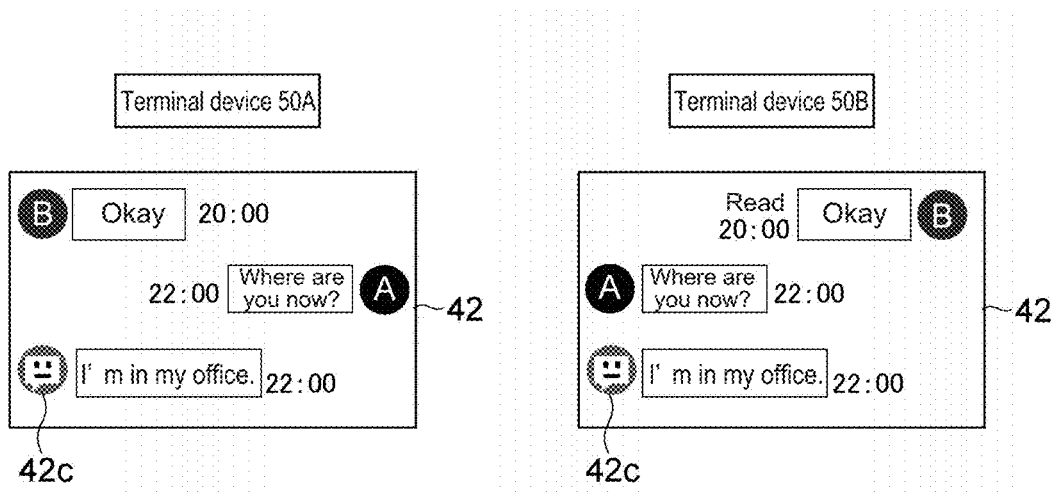
FIG. 6 illustrates a modification of GUIs illustrated in FIG. 5B.

FIG. 6 illustrates a modification of the GUIs illustrated in FIG. 5B. FIG. 6 illustrates another example of the information indicating that the message is automatically created by the automatic message creation section 69. In this example, the terminal devices 50A and 50B display an icon 42c that is adjacent to the message content, instead of the icon "A" or the icon "B". The icon 42c indicates a so-called "bot" (automatic processing performed by a robot).

Other examples of the information indicating that the message is automatically created by the automatic message creation section 69 include a message image that is different from a normal message image. Examples of the message image that is different from the normal message image include a type of characters in a message, a type of a region indicating a message content (including background), and the like. Here, the wording "type" means a format, a size, a color, a pattern, a font, or the like.

Figure 7A:
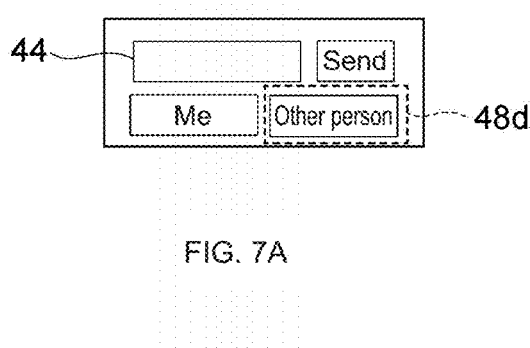
FIGS. 7A and 7B each illustrate GUIs presented by the messaging function section for allowing a user to select one of the "pull" operation or the "push" operation.
Figure 7B:
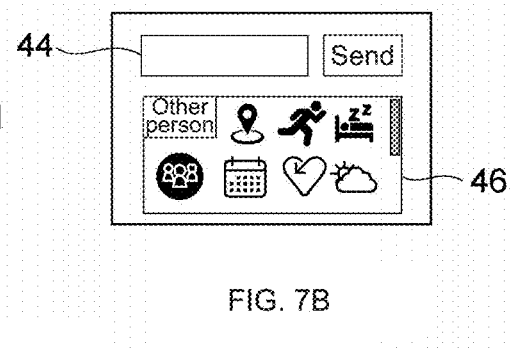

FIGS. 7A and 7B each illustrate GUIs presented by the messaging function section 33 for allowing the user to select one of the "pull" operation or the "push" operation. Here, FIGS. 7A and 7B illustrate UIs displayed on the terminal device 50A of the user A.

As illustrated in FIG. 7A, an image that makes it possible to select "me" (user A) or "other person" (user B) is displayed. When "me" is selected, the "push" operation is executed. When the "other person" enclosed by a dashed line 48d is selected, the "pull" operation is executed. For example, in the case where the "other person" is selected by the user A, the context icon selection region 46 indicating the list of icons of contexts that the user A wants to acquire is displayed as illustrated in FIG. 7B. As described above, fixed messages may be displayed instead of the icons.

In the case where the "me" ("push" operation) is selected by the user A, the messaging function section 33 also presents a GUI that is similar to the GUI illustrated in FIG. 7B.

As described above, according to the present embodiment, the automatic message creation section 69 of the server 60 automatically creates and transmits a message based on a context. This makes it possible to improve convenience of the messaging function section 33.

Benefits for the user B are as follows. One of the benefits is that it is possible to save labor to input an answer in response to a question from the user A. In addition, another one of the benefits is that it is possible to automatically reply to the user A even in the case where the user B does not notice that the question from the user A is received.

Benefits for the user A are as follows. One of the benefits is that it is possible to immediately receive a reply after asking the user B a question. In addition, another one of the benefits is that it is possible to ask the user B questions without any hesitation. In addition, another one of the benefits is that it is possible for the user A to save labor to input contexts of the user A himself/herself and save labor to check the input contexts in the case of the "push" operation performed by the user A. In addition, another one of the benefits is that it is possible to transmit the context of the user A himself/herself even when the user A does not know the his/her own context (such as a current location of the user A).

4. Application of Fingerprint Data

A plurality of pieces of fingerprint data of the user may be allocated to (associated with) respective functions executable for the messaging function section 33 or respective pieces of data associated with the messaging function section 33. In this case, the data holding section 20 functions as a storage section that stores such fingerprint data. Alternatively, the fingerprint data may be stored in the data holding section 61 of the server.

For example, the data holding section 20 (or 61) stores correspondence relation information indicating correspondence relations between pieces of fingerprint data of a plurality of fingers of the user A and predetermined context types (as illustrated in FIG. 4, contexts classified into the context categories or finer examples). The user A is capable of selecting a context type that the user A wants to acquire from the user B or a context type that the user A wants to transmit to the user B, in accordance with the plurality of pieces of his/her fingerprint data.

For example, the terminal devices 50 each include a fingerprint sensor below the "me" (push) button and the "other person" (pull) button illustrated in FIG. 7A. The terminal device 50 transmits a transmission request or a reception request of a context corresponding to a fingerprint to the server 60, on the basis of a finger that has touched the "me" button or the "other person" button.

The functions associated with the fingerprint data are not limited to the "pull" operation function or the "push" operation function. The functions associated with the fingerprint data may be associated with a transmission destination (destination of the message. It is sufficient to configure a setting in such a manner that the user associates the fingerprint data with destination information. In other words, the destination information is data associated with the messaging function section 33.

The functions associated with the fingerprint data are not limited to the destination information of the message. The functions associated with the fingerprint data may be a function of activating application software or functions included in the application software.

Such a configuration is appropriate for a terminal device including a relatively small display or casing in which it is impossible to dispose many buttons (selection items) In particular, such a configuration is appropriate for a wearable device. In the case where the present technology is applied to the wearable device, it is not necessary to manually input texts thanks to selection of the above-described icon or the operation based on the fingerprint data. This also results in removal of barriers to perform message communication through the "pull" operation or the "push" operation.

5. Application of Swipe Gesture

Figure 8:
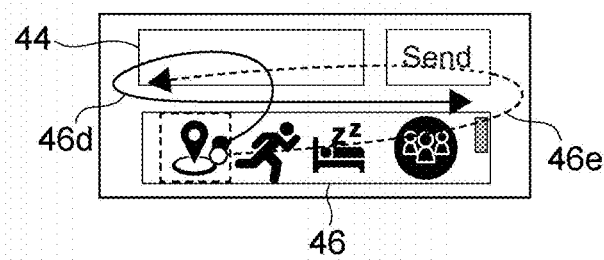
FIG. 8 illustrates an example of a GUI to which a swipe gesture is applied.

As another example, the operation section 14 may receive different swipe gestures, the respective swipe gestures corresponding to the reception request ("pull" operation) and the transmission request ("push" operation) made by the user. For example, as illustrated in FIG. 8, the user swipes his/her finger along a course 46d or a course 46e indicated by an arrow in a state where one of the icons in the context icon selection region 46 is tapped and the finger remains touching the screen. For example, the swipe course 46d indicated by a solid line represents the "pull" operation, and the swipe course 46e indicated by a dashed line represents the "push" operation.

Figure 9:
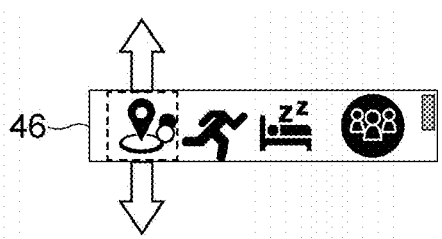
FIG. 9 illustrates another example of a GUI to which a swipe gesture is applied.

Alternatively, as illustrated in FIG. 9, the "push" operation may correspond to a gesture of tapping one of the icons in the context icon selection region 46 and swiping the icon in a direction indicated by an up arrow, and the "pull" operation may correspond to a gesture of tapping one of the icons in the context icon selection region 46 and swiping the icon in a direction indicated by an down arrow. This makes it possible to achieve intuitive operation methods corresponding to the "pull" direction and the "push" direction.

Alternatively, it is possible to apply a combination of the fingerprint data and the swipe gestures to the present technology. In other words, a method executed by the processing section 30 of the terminal device 50 includes a step of authenticating the fingerprint data and a step of recognizing the gesture operation.

Figures 10A, 10B:
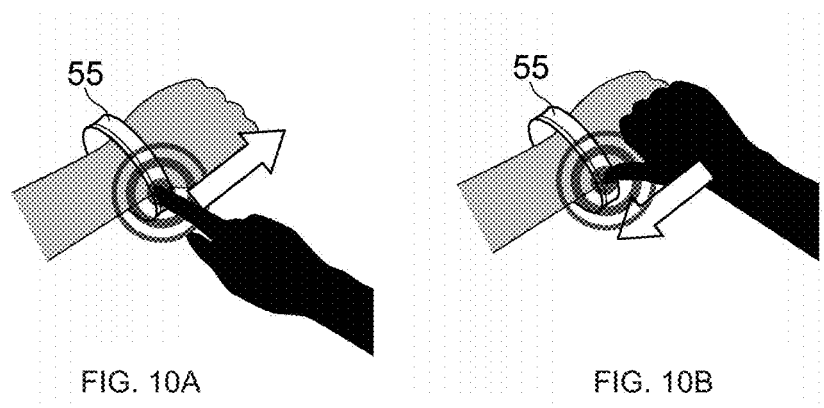
FIGS. 10A and 10B each illustrate an example of a GUI to which a combination of fingerprint data and a swipe gesture is applied.

For example, FIGS. 10A and 10B illustrates examples of the method. In FIG. 10A, the user performs the "push" operation on a wristband wearable device 55 serving as the terminal device. The "push" operation is illustrated in FIG. 9. An index finger is used for performing the operation. In FIG. 10B, the user puts a thumb on the wearable device 55 and performs the "pull" operation by using the thumb. As described above, destination information is associated with fingerprint data of each finger.

6. Display of Screen in Virtual Space

The present technology is also applicable to a technology of moving (the display 41 of) the terminal device 50 and looking a larger screen than the display 41 through the display 41. The larger display is a display in a virtual space. For example, although the wearable device has a small display region, it is possible for the wearable device to scan a whole screen and display the whole screen in the virtual space when the display region displays a portion (a partial screen) of the whole screen in the virtual space and the user moves the wearable device.

The arrangement of the display in the virtual space may be arbitrarily set by using a setting application included in the terminal device. Examples of the arrangement include multiple arrangement, curved arrangement, depth-direction overlap arrangement, and the like.

Note that, in this example, the terminal device 50 is capable of displaying the partial screen on the display 41 on the basis of an output value of the IMU.

7. Message Communication between Single User and Plurality of Users

Figure 11:
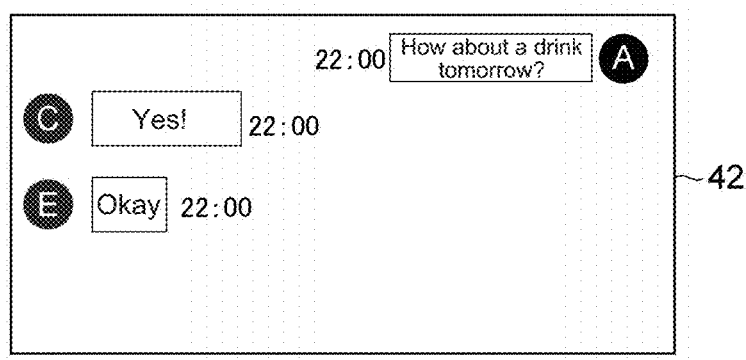
FIG. 11 illustrates an example of a GUI of a group messaging function.

The present technology is also applicable to message communication between a single user and a plurality of users (group messaging function). FIG. 11 illustrates an example of a GUI of the group messaging function. When using the group messaging function, it is possible for the messaging function section 33 to set a pre-registered group of users, as a group.

As illustrated in FIG. 11, in the case where (the terminal device 50A of) the user A transmits the message saying "How about a drink tomorrow?" as the "pull" operation in the group, messages are received from users C and E registered in the group. The messages are automatically created by the server 60.

The server 60 is capable of acquiring contexts as data of schedules of the respective users, and automatically creating the reply messages in response to the question asking "How about a drink tomorrow?" on the basis of the data of the schedules.

Figure 12:
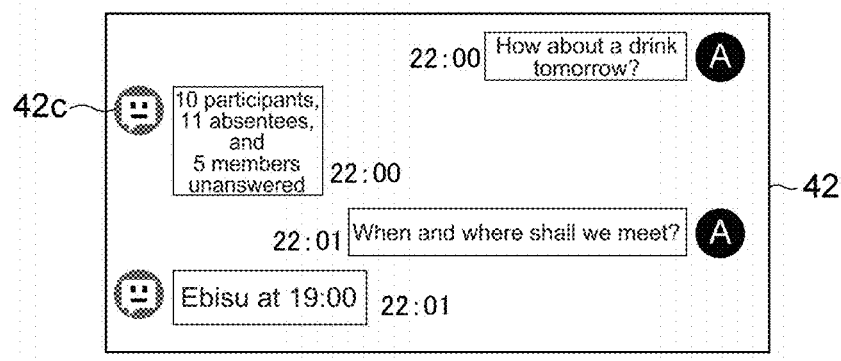
FIG. 12 illustrates an example of a GUI displaying an icon of a bot that takes control of a group with regard to the group messaging function.

FIG. 12 illustrates an example of a GUI displaying an icon of a bot that takes control of the group. The server 60 acquires the contexts of the respective users who has received the reception request from the user A as the "pull" operation, and creates a summarized message on the basis of the acquired contexts. In the example illustrated in FIG. 12, the summarized message indicates that "10 participants, 11 absentees, and 5 members unanswered".

The "unanswered member" are chosen in accordance with a setting of denying the reception request (denying the automatic reply) or a setting based on the above-described relationships between the users.

In addition, in the example illustrated in FIG. 12, the server 60 returns a message saying "Ebisu at 19:00" to the user A and the other users in the group in response to the "pull" operation that is a message saying "When and where shall we meet?" from the user A. The message saying "Ebisu at 19:00" is created on the basis of the contexts that are the schedule data of the respective users.

Figure 13:
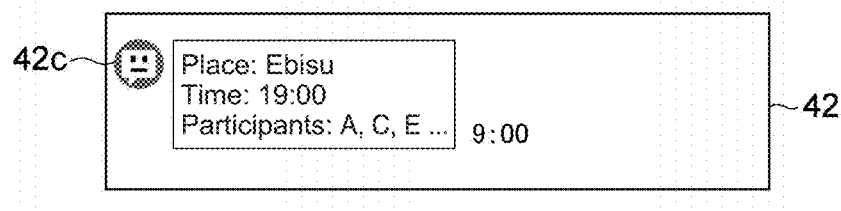
FIG. 13 illustrates a GUI displaying an example a reminder with regard to the example illustrated in FIG. 12.

FIG. 13 illustrates a GUI displaying an example a reminder with regard to the example illustrated in FIG. 12, for example. The server 60 may also automatically create such a reminder message and transmit the message to the respective users in the group.

8. Other Embodiments of Performance of System

Figure 14:
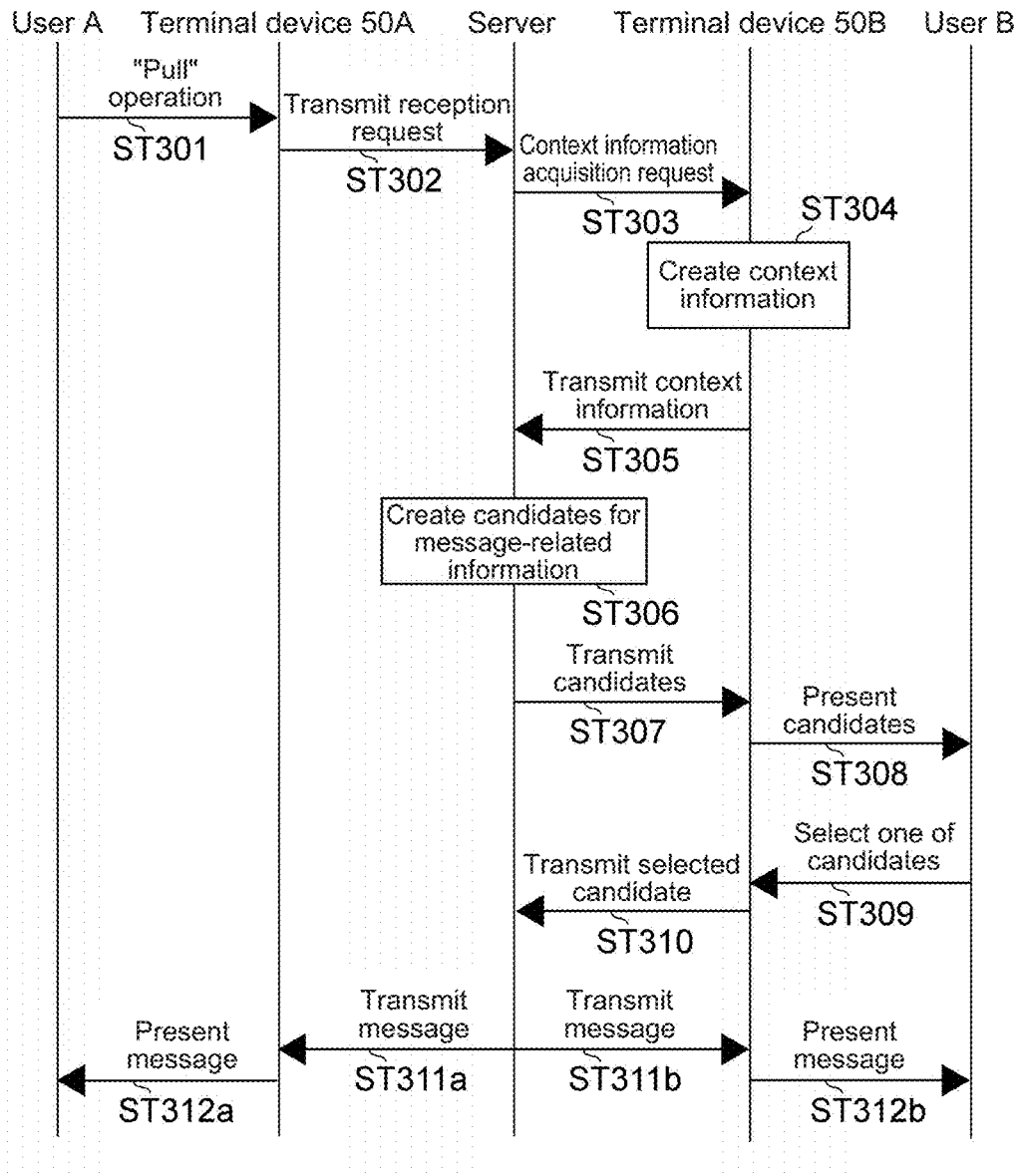
FIG. 14 illustrates performance according to another embodiment that is different from the performance of creating a message on the basis of the "pull" operation illustrated in FIG. 2.

FIG. 14 illustrates performance according to another embodiment that is different from the performance of creating a message on the basis of the "pull" operation illustrated in FIG. 2. ST 301 to ST 305 are the same processes as ST 101 to ST 105.

The server 60 creates (a plurality of) candidates for message-related information (ST 306), and presents the candidates to the user B via the terminal device 50B (ST 307 and ST 308). The user B operates the terminal device 50B to select one of the presented candidates for the message-related information and return the selected candidate to the server 60 (ST 309 and ST 310). In ways similar to the ST 107a, ST 107b, ST 108a, and ST 108n described above, the server 60 presents a message selected by the user B to the users A and B via the respective terminal devices 50A and 50B (ST 311a, ST 311b, ST 312a, and ST 312b).

As described above, examples of the message-related information include content of the message, a format of the message, and/or types, granularity, or the like of a current context serving as a premise for creating the message. The content of the message or the format of the message includes a format of expression of the message.

In ST 306, the server 60 may decide whether or not to create the candidates for the message-related information on the basis of information regarding the relationships between the users or the like among the contexts.

In the case where the context category is the "location" category, the granularity of the context means distinction among a rough administrative-district-based location, a narrower location in an office, a further narrower pinpoint location, or the like, for example. The server 60 prepares respective message candidates corresponding to the different types of granularity.

As described above, examples of the format of the message include a text format, an image format (including a stamp image, for example), a sound format, a video format, and the like. The server 60 prepares respective message candidates corresponding to the different message formats.

Examples of the types of formats of expression of the message content include informal expression, formal expression, decent-language, and other characteristic language, for example. The server 60 prepares respective message candidates corresponding to the different formats of expression.

To execute ST 311a and ST 311b, it is sufficient for the data holding section 61 to hold such messages in advance as fixed messages, or it is sufficient for the control section 63 to create a message corresponding to a selected message-related information.

Alternatively, the server 60 may create candidates for a message through learning based on the contexts. In this case, the contexts may be information indicating the relationship between the users as described above. Here, the contexts may be information indicating whether or not the users are keeping in touch with each other often, or information indicating whether the users are members of a family. Other examples of the context include a message format that is the user B prefers to use with regard to the user A. In this case, examples of the context include a fact that the user B has used different stamps or emojis for different other users.

In addition, examples of the control over communication of the message-related information include control over communication (here, mainly transmission) availability of a message as described above. In this case, after ST 305, the server 60 generates information (such as image or sound) for causing the user B to select whether to transmit the message based on the acquired context of the user B to the user A (transmission availability of the message), and transmits the generated information to the terminal device 50B. Alternatively, the server 60 is capable of perform control in such a manner that the server 60 does not respond to the user A (in other words, the server 60 does not communicate with the user A) on the basis of the relationship between the users serving as the contexts. In this case, examples of the context obtained in ST 305 include a context indicating that the users A and B has not kept in touch for a predetermined period of time, or the like, for example.

In the case where the user B denies the communication of the message, the server 60 receives information indicating the denial, and the subsequent processes (ST 311a, ST 311b, ST 312a, and ST 312b illustrated in FIG. 14) are not performed. Alternatively, in the case where the user B denies the communication of the message, the server 60 receives information indicating the denial, and transmits a message saying that the user B has denied the communication to at least the terminal device 50A of the user A.

Figure 15:
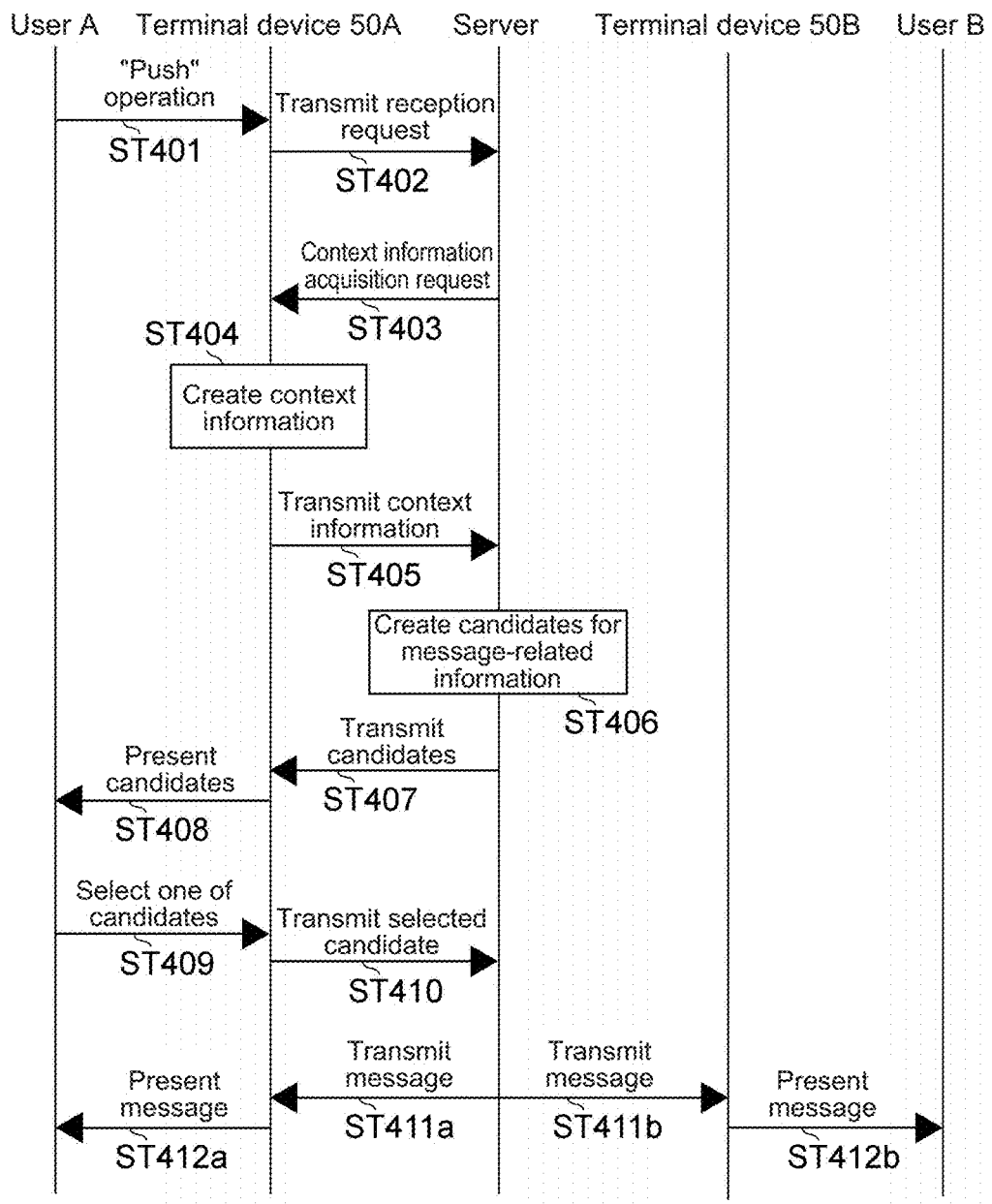
FIG. 15 illustrates performance according to another embodiment that is different from the performance of creating a message on the basis of the "push" operation illustrated in FIG. 3.

FIG. 15 illustrates performance according to another embodiment that is different from the performance of creating a message on the basis of the "push" operation illustrated in FIG. 3. The gist of FIG. 15 is similar to the processing illustrated in FIG. 14. In ST 406 to ST 410, the server 60 presents candidates for the message-related information to the user A, and the user A selects one of the candidates and returns the selected candidate to the server 60.

As described above, according to the present embodiment, a user who transmits the context can select the message-related information. Therefore, it is possible to provide the messaging function that is convenient for each user.

9. Context Publication Setting

The user may configure a setting that specifies whether or not to deny a context transmission request and a context reception request from each of other users who are message communication partners. In other words, this setting is a setting that specifies whether or not to disclose contexts of the user himself/herself to the partners. For example, it is sufficient for the server 60 to store, in the data holding section 20, setting information in which "user-to-user" information is associated with the above-described setting information.

In the case of the group including a plurality of users instead of the one-to-one communication, the server 60 may decide selection of transmission permission with regard to each partner in accordance with the contexts. For example, according to some transmission permission, a message is transmitted to a certain user but the message is not transmitted to another user. Such a case fits "11.4) Case 4", which will be described later.

10. Machine Learning Based on Context

Although some embodiments have already been described above, hereinafter an embodiment will be described where the server 60 acquires a context of a user and controls message-related information for a terminal device 50 of a partner through learning based on the acquired context. In other words, the server 60 controls creation of the message-related information through the learning using the context of the user, in particular with regard to the performances illustrated in FIG. 2, FIG. 3, FIG. 14, and FIG. 15.

Note that, the server 60 is capable of using various kinds of known learning algorithms such as a Bayesian algorithm, clustering, a neural network, a support vector machine (SVM), genetic programming, or an ensemble as necessary. Alternatively, the server 60 is also capable of utilizing results obtained through deep learning in addition to the machine learning.

In this case, the contexts include a past location of a user, past behavior of the user (including content of operation performed on the terminal device 50), a past means of transportation, other meta information, or the like. In addition, as described above, the contexts include content of past operation that has been manually performed on the terminal device 50 by the user, and data of an operation target.

The control section 63 of the server 60 is capable of controlling creation of the message-related information on the basis of the contexts. In other words, the server 60 controls content of a message, a format of the message (including a format of expression of the message), and/or types, granularity, or the like of a current context serving as a premise for creating the message, on the basis of the contexts.

10. Learning for Controlling Creation of Message-Related Information

A "message content" is used as an example of the message-related information that the server 60 creates on the basis of contexts of a user, which will be described hereinafter.

Example 1) Learning Using Context Belonging to Context Category Such as "Location" Category, "Travel" Category, "Means of Transportation" Category, "Behavior" Category, or "Neighbor" Category For example, the server 60 is capable of creating a message content on the basis of meta information related to a "location" and "travel" that serve as contexts of a user (by using the meta information). Specifically, the server 60 puts a "fence" around a predetermined geographical range centered on a "location" (position) of the user, and acquires meta information in the fenced region through reverse geocoding. Alternatively, the server 60 may put the "fence" around a path that connects at least two "locations". Such processing is executed in the case where a stay state of a context related to "travel" of the user is long (duration of stay at the position is long) or frequency of the context is high in a past "location" of the user. The high frequency means that the frequency exceeds a threshold, for example. The same applies hereinafter. Examples of the meta information include information such as shop names, station names, building names inside the fence.

Example 2) Learning Using Message-Related Information that User has Transmitted Manually.

The user manually transmits a message indicating a current location of the user such as a message saying "I'm in xx" to a partner. At this time, the server 60 acquires "xx" as meta information regarding a location associated with a context, and causes the data holding section 20 or 61 to hold such information. Subsequently, the server 60 creates a message by using the meta information in the case where the "pull" operation or the "push" operation is performed.

In addition, the server 60 may use a message format that is the same as the format of the message that the user transmits manually. In other words, the server 60 is capable of deciding the type of message format described above. For example, the server 60 is capable of searching for a message format having a high frequency of manual transmission performed by the user, and creating a message.

In a way similar to the above-described message format, the server 60 may use a format of expression of a message content that is the same as the format of expression of the message content that the user transmits manually.

Example 3) Learning Using Explicit Feedback from User

In the case where a context having no label of the context type (such as a context that does not belong to any category) is input to the terminal device 50, the server 60 notifies the user that there is no label corresponding to the context. In response to the notification, the user input meta information related to the context having no label to the terminal device 50. Any input method can be used such as a text creation method, a speech recognition method, or an image recognition method. Hereinafter, the server 60 uses the context type set by the user to create a message.

Alternatively, after automatic transmission of a message, the server 60 may present a notification asking "Do you like this expression?" via the terminal device 50, and this allows the user to make an evaluation by pressing a "good" button or a "bad" button to indicate whether the expression is appropriate. In this case, the server 60 may give increased priority to usage of highly evaluated formats, content, and expressions, and may give decreased priority to usage of lowly evaluated formats, content, and expressions to create a future message. Alternatively, the user may set a format of expression of content of a message to a partner user through pre-registration.

10.2) Control Over Communication of Message-Related Information in Response to Transmission or Reception Request In the above description, the control over communication availability of a message is exemplified as control over communication of message-related information. However, the control is not limited to the two security levels related to the availability. It is also possible to set three or more security levels. In the case of the three or more security levels, a second level between a level indicating that the communication is available and a level indicating that the communication is not available indicates presentation of candidates for the message-related information as described above. In addition, it is also possible to set the security level to content of each of the candidates.

The security levels may be levels representing whether or not permission of the communication is given to a partner (communication availability of a message) or may be levels corresponding to the content of the message (for example, levels representing what kind of content is permitted to be written and transmitted).

Example 1) Learning Using Context Belonging to Context Category such as "Location" Category, "Travel" Category, "Means of Transportation" Category, "Behavior" Category, or "Neighbor" Category For example, in the case where two or more users are in an adjacent state for a long period of time and frequency of the adjacent state is high with regard to a "neighbor" context, the server 60 is capable of determining that the users are close to each other and configures a setting in such a manner that the security level of message communication between the user gets lower.

Alternatively, for example, with regard to a context of "location" having a label of "office", a partner user whose stay state or adjacent state lasts long is potentially a mere co-worker at the same office. Therefore, it is possible to configure a setting in such a manner that the security level does not get lower.

Alternatively, for example, in the case where the server 60 transmits an automatically created message to the user but the user does not actually respond to the message, it is possible to prevent automatic creation of a message with regard to contexts related to the message.

Example 2) Learning Using Message-Related Information that User has Transmitted Manually.

The server 60 is capable of lowering the security level of a partner user who has a high frequency of transmission of a message, for example.

Alternatively, when content of an actually transmitted message include a context, the server 60 is capable of lowering a security level corresponding to the context.

Example 3) Learning Using Explicit Feedback from User

When the user receives a transmission request or a reception request from a partner user for the first time, the server 60 is capable of causing the user to configure a setting that specifies whether to set the partner user as an automatic reply target user.

When the user receives a transmission request or a reception request from a partner user for the first time, the server 60 is capable of causing the user to configure a setting in such a manner that a message based on the context is not received, 11. Specific Case to which Present Technology is Applicable 11.1) Case 1

The three users A, B, and C promise to meet each other. The users B and C has arrived at a meeting place, but the user A has not arrived yet. When the user B uses a message app in a smartphone to transmit a reception request ("pull" operation) of a "location" context by using trigger words saying "A, where are you now?" through group messaging function of the user A, B, and C (such as the state illustrated in FIG. 12), a bot of the group messaging function automatically replies a message saying "A has left x station by train". The users B and C view the message and recognize that the user A will arrive soon.

On the other hand, the user A notices that a his/her own wearable device has received the reception request and the automatic reply message just before notifying the users B and C that the user A may be late. Therefore, the user A transmits no message.

However, the user A worries whether the users B and C have already met at the meeting place. Accordingly, the user A selects icons representing a question asking "Where are you now?" and a question asking "Who are you with now?" through the group messaging function, and transmits reception requests of (messages of) contexts of "location" and "neighbor" (accompanying person). Next, the server 60 serves as a bot and replies a message saying "B and C are at Shinagawa station." and a message saying "B and C are together".

11.3) Case 2

A user D is a husband, a user E is a wife of the user D, and they have a five-year-old child F. After taking the child F to a hospital, the user E puts her thumb on a fingerprint sensor of a wristband device and create a message to the user D to ask the user D to come and pick up her and her child. At this time, the user E puts and presses her index finger on the fingerprint sensor ("push" operation). To the index finger, the context of "travel" is allocated.

Next, the wristband device of the user E displays a message saying "I just left the hospital." and a message saying "I'm walking down the street in front of the hospital," as messages corresponding to the her context of "travel", and a stamp image indicating that "my child and I are walking outside a hospital" or the like as options. The display region of the wristband device is not enough to display all the information. However, the user E is capable of moving her arm to display a screen in a virtual space and check all the information. The user E taps the stamp image out of the options, and transmits the stamp image to the user D. The user D views the stamp image displayed on his terminal device 50 and goes pick up the user E and the child F.

11.3) Case 3

Users G and H have a lunch appointment at their favorite restaurant (name of restaurant is "ww"). The user H has enabled a setting of confirming transmission in advance before replying a message based on a context. The user G arrives at the restaurant before the user H, and transmits a reception request asking "Where are you now?" to the user H because he is bored. A wearable device of the user H displays confirmation of a message saying "May I send a message saying 'I'm in yy'?" (transmission availability as described above). Subsequently, the user H confirms the content of the message and transmits the message to the user G.

In past, a context of "travel" of the user H himself has been recognized as a stay state for a certain period of time or more, and the user H has manually input and transmitted a message saying "I'm shopping at yy." through the messaging function section 33 (or another message app) or the like. "yy" is located within a predetermined distance from the favorite restaurant or a department store including the favorite restaurant. The server 60 has already learned meta information regarding the location of "yy" through language processing of the message content. Therefore, the server 60 automatically creates a message including "yy".

Next, after the shopping at "yy", the user H heads to the restaurant. When the user H makes a transmission request ("push" operation) of his own context to transmit the message to the user G, the wearable device of the user H displays two options including an option indicating a message saying "I'm going to ww" and an option indicating a message saying "I'm going there".

Since the proper noun "ww" is used in content of a past message for promising to meet with the user H, the server 60 holds the proper noun "ww" as meta information, and the user G presents the message saying "I'm going to ww" as one of candidates. In addition, since the server 60 recognizes that the user H is heading to a direction of the user G on the basis of temporal changes in GNSS information of both of the users, the server 60 presents the message saying "I'm going there" as one of the candidates.

The user H selects and transmits the message saying "I'm going there" while walking.

11.4) Case 4

A user I wants to hold a drinking party, and ask "How about a drink at bb tonight?" through a group messaging function of co-workers. "bb" represents a name of place or a name of station. The server 60 refers to schedules of a plurality of users in a group and transmits the message to users who have nothing planned for tonight. As a result, some participants (users J, K, and L) are attracted.

At night, the users I, J, K have already arrived at a meeting place, but the user L has not arrived yet. Therefore, the user I makes a transmission request asking "Where are you now?" through the group messaging function. The server 60 does not transmit the transmission request message to the users J and K who are obviously adjacent to the user I on the basis of the context of "neighbor" of the user I. On the other hand, the transmission request message is transmitted to only the user L who is not adjacent to the user I. The server 60 replies a message based on a context of "location" of the user L. This allows the three users I, J, K to confirm the current location of the user L.

12. Modification

The present technology is not limited to the above-described embodiment. Various other embodiments are possible.

For example, the terminal device A or B may executes at least one of the processes executed by the server 60 as illustrated in FIG. 2, FIG. 3, FIG. 14, and FIG. 15. The terminal devices A and B may be configured to directly communicate with each other without using the server 60 in the case where the terminal devices A and B are capable of executing all the processes executed by the server 60.

Note that, the present technology may also be configured as below.

(1) An information processing apparatus, including:

a communication section configured to communicate a message between respective terminal devices used by a plurality of users; and a control section configured to acquire a context of one or more users among the plurality of users, and control at least one of creation or communication of message-related information including content or a format of the message on the basis of the acquired context.

(2) The information processing apparatus according to (1), in which the communication section is configured to acquire a reception request for receiving the context of the user, and the control section includes a creation section configured to acquire the context on the basis of the reception request and create at least one of information for allowing selection of whether to communicate the message or a candidate to select the message-related information, on the basis of the context.

(3) The information processing apparatus according to (1), in which the communication section is configured to acquire a transmission request for transmitting the context of the user, and the control section includes a creation section configured to acquire the context on the basis of the transmission request and create at least one of information for allowing selection of whether to communicate the message or a candidate to select the message-related information, on the basis of the context.

(4) The information processing apparatus according to any one of (1) to (3), in which the communication section is configured to transmit information indicating that the content of the message is automatically created.

(5) The information processing apparatus according to any one of (1) to (4), in which the control section is configured to perform control based on the context on the basis of content or a format of a message that has been communicated in past.

(6) The information processing apparatus according to (5), in which the content of the message that has been communicated in past includes at least one of a position of the user, a means of transportation of the user, behavior of the user, or a message format.

(7) The information processing apparatus according to (5), in which the control section includes a creation section configured to create a candidate to select the message-related information based on the context in a message format corresponding to frequencies of formats of messages that have been communicated in past.

(8) The information processing apparatus according to (5), in which the control section includes a creation section configured to create a candidate to select the message-related information based on the context in a format of expression corresponding to frequencies of formats of expression of content of messages that have been communicated in past.

(9) The information processing apparatus according to any one of (1) to (8), in which the context includes at least one of a past context, a current context, or a future context of the user.

(10) The information processing apparatus according to any one of (1) to (9), in which the control section is configured to acquire a context based on input information that has been input to an input section of the terminal device.

(11) The information processing apparatus according to (10), in which the input section includes at least one of a microphone, a camera, an operation section, a position sensor, or an inertial measurement section (MIU), and the input section is configured to acquire at least one of a position of the user, a means of transportation of the user, behavior of the user, or content of operation performed by the user on the operation section, as the input information.

(12) The information processing apparatus according to any one of (1) to (11), in which the control section is configured to control a security level of communication of the message-related information on the basis of the context.

(13) The information processing apparatus according to (12), in which the security level includes at least one of communication availability of the message, a communication destination of the message, or the content of the message.

(14) A terminal device to be used by a user among a plurality of terminal devices to be used by respective users, the terminal device, including:

a messaging function section that has a function of creating a message; and a communication section configured to communicate the message between the terminal device and another terminal device via an information processing apparatus configured to acquire the context of the user and control at least one of creation or communication of message-related information including content or a format of the message on the basis of the acquired context.

(15) The terminal device according to (14), in which the communication section is configured to make at least one of transmission of a reception request for receiving a context of another user from the other terminal device, or transmission of a transmission request for transmitting the context of the user to the other terminal device.

(16) The terminal device according to (14) or (15), further including:

an input section to which input information is to be input; and a display that displays at least one of message-related information or an icon image, each of which corresponding to a current context of the user or another user in the input information.

(17) The terminal device according to any one of (14) to (16), further including:

a storage section that stores fingerprint data of the user allocated to data associated with the messaging function section or a function that is executable for the messaging function section.

(18) The terminal device according to (17), further including:

an operation section that receives operation performed by the user, in which the operation section is configured to receive different swipe gestures, the respective swipe gestures corresponding to transmission of the reception request and transmission of the transmission request.

(19) An information processing method to be performed by an information processing apparatus configured to communicate a message between respective terminal devices used by a plurality of users, the information processing method including:

acquiring a context of one or more users among the plurality of users; and controlling at least one of creation or communication of message-related information including content or a format of the message on the basis of the acquired context.

(20) A program that causes an information processing apparatus configured to communicate a message between respective terminal devices used by a plurality of users, to:

acquire a context of one or more users among the plurality of users; and control at least one of creation or communication of message-related information including content or a format of the message on the basis of the acquired context.

REFERENCE SIGNS LIST 10 input section
11 microphone
12 camera
13 antenna
14 operation section
15 sensor
20, 61 data holding section
30 processing section
33 messaging function section
35, 65 communication section
40 output section
42a message content
46d, 46e swipe course
50, 50A, 50B terminal device
55 wearable device
60 server
63 control section
69 automatic message creation section

The invention claimed is:

1. An information processing apparatus, comprising:
  circuitry configured to:
    communicate a message between respective terminal devices used by a plurality of users;

acquire a context of one or more users among the plurality of users;

control creation and communication of message-related information, including content or a format of the message, on a basis of the acquired context; and transmit, to the respective terminal devices used by the plurality of users in addition to the message, information which indicates that the content of the communicated message is automatically created.

2. The information processing apparatus according to claim 1, wherein the circuitry is further configured to:

acquire a reception request to receive the context of the one or more users, wherein the context is acquired on a basis of the reception request; and create at least one of information for allowing selection of whether to communicate the message or a candidate to select the message-related information, on a basis of the context.

3. The information processing apparatus according to claim 1, wherein the circuitry is further configured to:

acquire a transmission request to transmit the context of the one or more users, wherein the context is acquired on a basis of the transmission request; and create at least one of information for allowing selection of whether to communicate the message or a candidate to select the message-related information, on a basis of the context.

4. The information processing apparatus according to claim 1, wherein the circuitry is further configured to:

perform control based on the context on a basis of content or a format of a message that has been communicated in past.

5. The information processing apparatus according to claim 4, wherein the content of the message that has been communicated in past includes at least one of a position of the one or more users, a means of transportation of the one or more users, behavior of the one or more users, or a message format.

6. The information processing apparatus according to claim 4, wherein the circuitry is further configured to:

create a candidate, to select the message-related information based on the context, in a message format that corresponds to frequencies of formats of messages that have been communicated in past.

7. The information processing apparatus according to claim 4, wherein the circuitry is further configured to:

create a candidate, to select the message-related information based on the context, in a format of expression that corresponds to frequencies of formats of expression of content of messages that have been communicated in past.

8. The information processing apparatus according to claim 1, wherein the acquired context includes at least one of a past context, a current context, or a future context of the one or more users.

9. The information processing apparatus according to claim 1, wherein the circuitry is further configured to:

acquire the context based on input information that has been input to at least one of the respective terminal devices used by the plurality of users.

10. The information processing apparatus according to claim 9, wherein each terminal device of the respective terminal devices includes at least one of a microphone, a camera, a button, a touchscreen, a position sensor, or an inertial measurement sensor, and each terminal device of the respective terminal devices is configured to acquire at least one of a position of a corresponding user among the plurality of users, a means of transportation of the corresponding user, behavior of the corresponding user, or content of operation performed by the corresponding user on a terminal device thereof, as the input information.

11. The information processing apparatus according to claim 1, wherein the circuitry is further configured to:

control a security level of communication of the message-related information on a basis of the acquired context.

12. The information processing apparatus according to claim 11, wherein the security level includes at least one of communication availability of the message, a communication destination of the message, or the content of the message.

13. The information processing apparatus according to claim 1, wherein the circuitry is further configured to automatically communicate, to the respective terminal devices used by the plurality of users, the message and the information which indicates that the content of the communicated message is automatically created.

14. A terminal device to be used by a user among a plurality of terminal devices to be used by respective users, the terminal device comprising:

circuitry configured to:

create a message; and communicate the message between the terminal device and another terminal device of the plurality of terminal devices via an information processing apparatus configured to:

acquire a context of the user;

control creation and communication of message-related information, including content or a format of the message, on a basis of the acquired context; and transmit, to the terminal device and another terminal device in addition to the message, information which indicates that the content of the communicated message is automatically created.

15. The terminal device according to claim 14, wherein the circuitry is further configured to:

make at least one of transmission of a reception request to receive a context of another user from the other terminal device, or transmission of a transmission request to transmit the context of the user to the other terminal device.

16. The terminal device according to claim 14, further comprising:

a display that displays at least one of message-related information or an icon image, each of which corresponds corresponding to a current context of the user or another user in input information.

17. The terminal device according to claim 14, wherein the circuitry is further configured to:

store fingerprint data of the user allocated to data associated with the circuitry or a function that is executable for the circuitry.

18. The terminal device according to claim 17, wherein the circuitry is further configured to:
- receive operation performed by the user on the terminal device; and
- receive different swipe gestures performed by the user on the terminal device, wherein a swipe gesture of the different swipe gestures corresponds to one of transmission of a reception request to receive a context of another user from the other terminal device or transmission of a transmission request to transmit the context of the user to the other terminal device.

19. An information processing method to be performed by an information processing apparatus, the information processing method comprising:
- communicating a message between respective terminal devices used by a plurality of users;
- acquiring a context of one or more users among the plurality of users;
- controlling creation and communication of message-related information, including content or a format of the message, on a basis of the acquired context; and
- transmitting, to the respective terminal devices used by the plurality of users in addition to the message, information which indicates that the content of the communicated message is automatically created.

20. A non-transitory computer-readable medium, having stored thereon, computer-executable instructions that, when executed by a computer, cause the computer to execute operations, the operations comprising:
- communicating a message between respective terminal devices used by a plurality of users;
- acquiring a context of one or more users among the plurality of users;
- controlling creation and communication of message-related information, including content or a format of the message, on a basis of the acquired context; and
- transmitting, to the respective terminal devices used by the plurality of users in addition to the message, information which indicates that the content of the communicated message is automatically created.

* * * * *